(12) United States Patent
Lubrecht et al.

(10) Patent No.: US 7,552,208 B2
(45) Date of Patent: Jun. 23, 2009

(54) METHODS FOR MANAGING CAPACITY

(75) Inventors: Michael D. Lubrecht, Carnation, WA (US); Kathryn A. Pizzo, Bellevue, WA (US); Andrew Savvides, Herts (GB); Anthony Baron, Woodinville, WA (US); Efstathios Papaefstathiou, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 648 days.

(21) Appl. No.: 11/037,659

(22) Filed: Jan. 18, 2005
(Under 37 CFR 1.47)

(65) Prior Publication Data
US 2006/0161884 A1 Jul. 20, 2006

(51) Int. Cl.
G06F 15/173 (2006.01)
G06F 12/00 (2006.01)
(52) U.S. Cl. ...................... 709/223; 709/250
(58) Field of Classification Search ......... 709/223–226, 709/250
See application file for complete search history.

(56) References Cited
U.S. PATENT DOCUMENTS
2003/0120771 A1* 6/2003 Laye et al. ................. 709/224

2003/0187967 A1* 10/2003 Walsh et al. ................ 709/223
2005/0086335 A1* 4/2005 Liu et al. .................... 709/223
2006/0225032 A1* 10/2006 Klerk et al. ................ 717/105
2008/0059625 A1* 3/2008 Barnett et al. .............. 709/223

OTHER PUBLICATIONS

"Microsoft Operations Framework", White Paper. Jan. 2001. Version 2.0.*

* cited by examiner

Primary Examiner—Zarni Maung
(74) Attorney, Agent, or Firm—Wolf, Greenfield & Sacks, P.C.

(57) ABSTRACT

In one aspect, a method of instructing at least one operator in a best practices implementation of a process for managing resource capacity in an information technology (IT) environment is provided. The method comprising providing instructions to the at least one operator to perform acts of: (A) creating at least one model of at least some aspects of the IT environment; (B) analyzing the at least one model to determine cost information relating to the modeled IT environment; (C) applying at least one simulated use condition to the at least one model; (D) analyzing performance of the at least one model under the at least one simulated use condition to determine information relating to at least a utilization of resources in the modeled IT environment and to determine resources in the modeled IT environment that create performance bottlenecks in the modeled IT environment; and (E) modifying at least one aspect of the at least one model impacting resource capacity based on the information determined in (B) and/or (D).

20 Claims, 8 Drawing Sheets

METHODS FOR MANAGING CAPACITY

FIELD OF THE INVENTION

The present invention relates to operation of a capacity management facility in a computer system.

BACKGROUND OF THE INVENTION

Networked computer systems play important roles in the operation of many businesses and organizations. The performance of a computer system providing services to a business and/or customers of a business may be integral to the successful operation of the business. A computer system refers generally to any collection of one or more devices interconnected to perform a desired function, provide one or more services, and/or to carry out various operations of an organization, such as a business corporation, etc.

In some computer systems, the operation and maintenance of the system is delegated to one or more administrators (or operators) that make up the system's information technology (IT) organization. When a computer system is managed by an IT organization, the computer system may be referred to as an IT environment. The IT organization may set-up a computer system to provide end users with various application or transactional services, access to data, network access, etc., and establish the environment, security and permissions landscape and other capabilities of the computer system. This model allows dedicated personnel to customize the system, centralize application installation, establish access permissions, and generally handle the operation of the enterprise in a way that is largely transparent to the end user. The day-to-day maintenance and servicing of the system as well as the contributing personnel are referred to as IT operations (or "operations" for short).

As computer systems become more complex and as organizations continue to rely more on the resources and services provided by their respective computer systems, maintaining the system and ensuring that services provided by the system are available becomes increasingly important, more complex, and more difficult to achieve.

In particular, managing the capacity of a large computer system may present challenges to IT organizations. As used herein, the capacity of a computer system refers to the quantity of resources available to the system for carrying out the tasks of the computer system. These resources may be any type of resources, such as, for example, hardware resources, software resources, and/or human resources. Poor capacity management may result in failure of the computer system. For example, a computer system that hosts an e-commerce web site selling toys may become particularly busy during certain times of the year (e.g., during the holiday season). Failure to increase the capacity of the computer system to meet the increased demand during these times of the year may result in the web site overloading and the computer system crashing. Conversely, overestimating the magnitude of the increase in demand may result in purchasing too much additional capacity, thereby wasting money and underutilizing resources.

In addition, operations often handle capacity management problems as they arise, leading to a patchwork of solutions that become difficult to understand and maintain. In general, different IT organizations approach similar capacity management challenges very differently, without any cohesive guidelines regarding how to how to plan, justify, and manage appropriate levels of resources needed to perform the tasks of the computer system.

SUMMARY OF THE INVENTION

In one embodiment, a method of instructing an operator or multiple operators may be used to aid in managing resource capacity for the IT environment. The instructions may instruct the operator to model the IT environment. This may be accomplished, for example, by first monitoring the IT environment to collect data and then analyzing the data from the IT environment to determine what components of the IT environment should be monitored. A model of the IT environment may then be created based on the collected data. The model of the IT environment may be used to create simulated conditions and to determine the performance of the IT environment, including determining if resources are being properly utilized and determining if a resource is creating a bottleneck in the IT environment. The cost of making certain changes to the IT environment (e.g., removing or adding resources) may also be determined and compared to the potential performance gains are losses caused by those changes.

One embodiment of the invention is directed to a method of instructing at least one operator in a best practices implementation of a process for managing resource capacity in an information technology (IT) environment. The method comprises providing instructions to the at least one operator to perform acts of: (A) creating at least one model of at least some aspects of the IT environment; (B) analyzing the at least one model to determine cost information relating to the modeled IT environment; (C) applying at least one simulated use condition to the at least one model; (D) analyzing performance of the at least one model under the at least one simulated use condition to determine information relating to at least a utilization of resources in the modeled IT environment and to determine resources in the modeled IT environment that create performance bottlenecks in the modeled IT environment; and (E) modifying at least one aspect of the at least one model impacting resource capacity based on the information determined in (B) and/or (D).

Another embodiment of the invention is directed to a method of managing resource capacity in an information technology (IT) environment, the method comprising: following best practices instructions for management of the resource capacity, including instructions to perform acts of: (A) creating at least one model of at least some aspects of the IT environment; (B) analyzing the at least one model to determine cost information relating to the modeled IT environment; (C) applying at least one simulated use condition to the at least one model; (D) analyzing performance of the at least one model under the at least one simulated use condition to determine information relating to at least a utilization of resources in the modeled IT environment and to determine resources in the modeled IT environment that create performance bottlenecks in the modeled IT environment; and (E) modifying at least one aspect of the at least one model impacting resource capacity based on the information determined in (B) and/or (D).

A further embodiment is directed to a method of instructing at least one operator in a best practices implementation of a process for managing resource capacity in an information technology (IT) environment, the method comprising providing instructions to the at least one operator to perform acts of: (A) performing resource capacity management in a hierarchical manner that comprises at least the following tiers: a business capacity management tier that ensures that future business requirements for the IT environment are considered, planned and implemented in time to be functioning when business needs make them desirable; a service capacity management tier that focuses on the management of the performance of operational services provided by the IT environment and used by users of the IT environment; and a resource capacity management tier that focuses on the management of individual components of the IT environment; (B) creating at least one model of at least some aspects of the IT environment, the at least one model comprising at least one model of the IT environment at the business capacity management tier, at least one model of the IT environment at the service capacity management tier, and at least one model of the IT environment at the resource capacity management tier; and (C) considering information derived from the at least one model of the IT environment at the service capacity management tier and/or information derived from the at least one model of the IT environment at the resource capacity management tier in determining modifications to the IT environment at the business capacity management tier.

Another embodiment is directed to a method of managing resource capacity in an information technology (IT) environment, the method comprising: following best practices instructions for management of the resource capacity, including instructions to perform acts of:

(A) performing resource capacity management in a hierarchical manner that comprises at least the following tiers: a business capacity management tier that ensures that future business requirements for the IT environment are considered, planned and implemented in time to be functioning when business needs make them desirable; a service capacity management tier that focuses on the management of the performance of operational services provided by the IT environment and used by users of the IT environment; and a resource capacity management tier that focuses on the management of individual components of the IT environment; (B) creating at least one model of at least some aspects of the IT environment, the at least one model comprising at least one model of the IT environment at the business capacity management tier, at least one model of the IT environment at the service capacity management tier, and at least one model of the IT environment at the resource capacity management tier; and (C) considering information derived from the at least one model of the IT environment at the service capacity management tier and/or information derived from the at least one model of the IT environment at the resource capacity management tier in determining modifications to the IT environment at the business capacity management tier.

DETAILED DESCRIPTION

Applicants have recognized that difficulties in maintaining a computer system include not only the challenges of accurately predicting the quantity of resources needed to perform the tasks of the computer system and ensuring that sufficient resources are available, but extend to the relatively haphazard approach IT operations have taken in solving capacity problems. Many service failures in an IT environment may be attributable to tendency of IT organizations to deal with capacity problems as they arise and to not take steps to prevent such problems before they arise.

In one embodiment of the present invention, a cohesive process for capacity management in an IT environment is provided and may be employed by an IT organization. In one embodiment, the process for capacity management may entail modeling the IT environment and using the model to determine cost information relating to the IT environment, information relating to the utilization of resources in the IT environment, and/or resources that create performance bottlenecks in the IT environment.

The cost information may include, for example, information estimating the cost of providing certain resources in the IT environment, allowing an operator to compare the estimated cost of providing these resources to the performance improvement that the resources are expected to provide. However, any suitable cost information may be determined as the invention is not limited in this respect.

In another embodiment of the invention, a best practices approach to managing resource capacity in an IT environment may be provided to an operator, instructing the operator to perform resource capacity management in a hierarchical manner. In one embodiment, the best practices approach instructs the operator to perform capacity management at at least three tiers. At a business capacity management tier, a model of the IT environment may be created that focuses on future business requirements of the IT environment, so that these requirements may be functioning when business needs make them desirable. At a service capacity management tier, a model of the IT environment may be created that focuses on performance of the operational services provided by the IT environment. At a resource capacity management tier, a model of the IT environment may be created that focuses on management of individual components of the IT environment. A model at one tier may employ information derived from the model at another tier. For example, the model of the IT environment at the business capacity management tier may employ information derived from the model of the IT environment at the service capacity management tier and/or the model at the resource capacity management tier.

Figure 1:
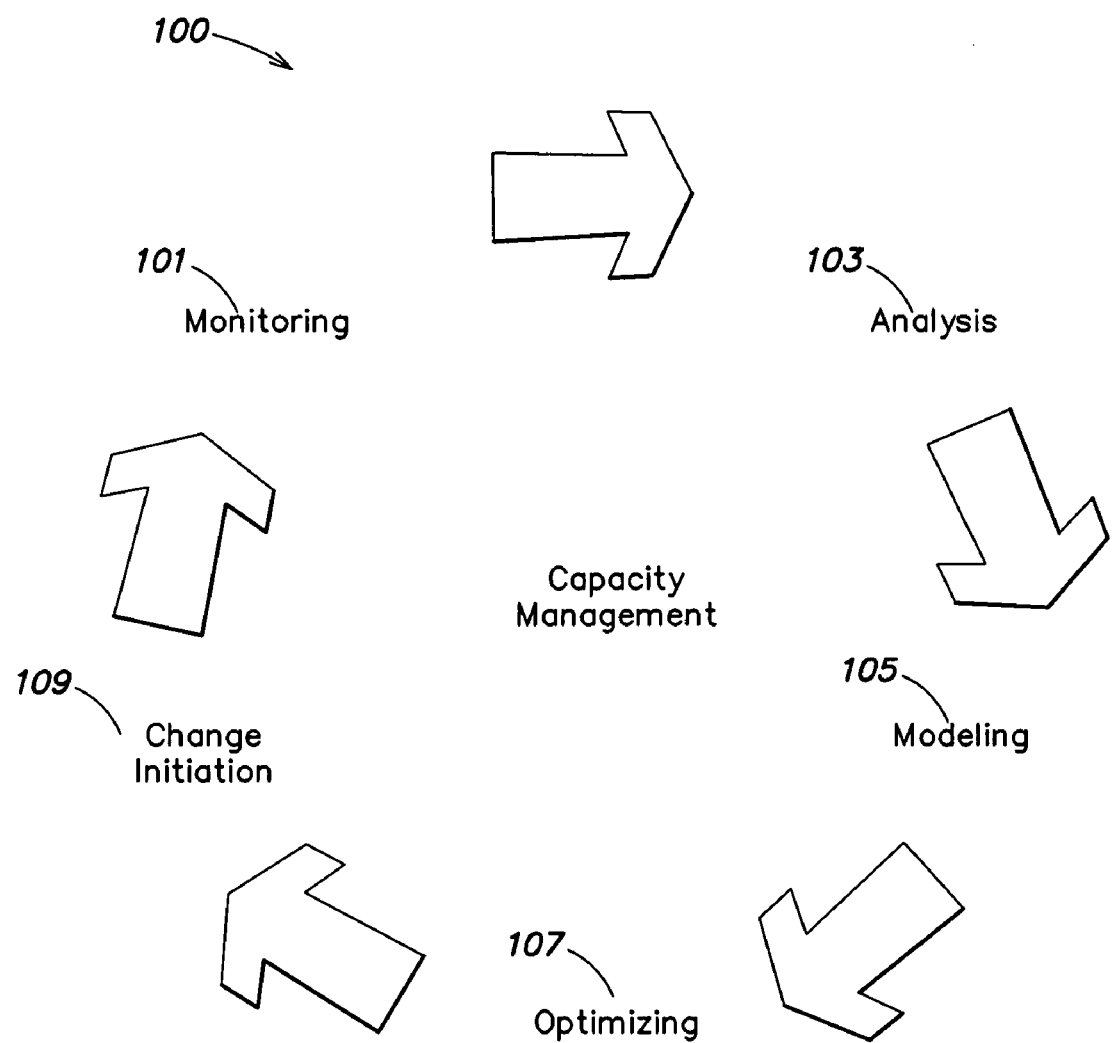
FIG. 1 is a diagram illustrating a process for capacity management, in accordance with one embodiment of the invention.

FIG. 1 is a flow diagram of a process 100 for implementing capacity management in an IT environment in accordance with one embodiment of the present invention. Process 100 includes five phases: monitoring phase 101; analysis phase 103; modeling phase 105; optimizing phase 107; and change initiation phase 109. The process 100 is continued, such that it can be considered to "begin" at any of these phases.

In monitoring phase 101, the current capacity of the IT environment is defined. This may be done in any suitable way. For example, certain hardware, software, and/or human resources of the IT environment may be determined to be the resources that contribute significantly and/or are critical to the successful operation of the IT environment, such that these resources can be determined to justify management according to the process. These resources may be monitored and performance data for these resources may be collected. This monitoring may be performed in any suitable way, e.g., short-term monitoring or long-term monitoring. Monitoring resources may include, for example, monitoring the utilization of a CPU or monitoring the transaction rate for a web site. It should be appreciated that these are only examples of resources that may be monitored, as the invention is not limited in this respect.

In analysis phase 103, data obtained in monitoring phase 101 may be analyzed. This may be done in any suitable way. For example, the data may be analyzed to determine when a resource is at or nearing its capacity, so that, for example, when an alarm or exception should be raised. For example, it may be determined from monitoring phase 101 that whenever the CPU utilization of an IT environment is at 80 percent for a period of an hour or more, the IT environment has experienced a significant decline in performance. This information may be used to raise an alarm whenever CPU utilization reaches such levels. The data may also be analyzed to establish baseline service levels or utilization levels so that the operator has an idea of what resources are needed in normal operation of the system.

In modeling phase 105, a model of the IT environment may be used to evaluate the effect of certain adjustments on the IT environment. This may be done in any suitable way. For example, simulations may be used to investigate "what-if" scenarios and see how changes in capacity and/or demand will affect the overall IT environment. Modeling may take into account the cost of a decision, such as adding new resources, so that the cost of the decision may be compared to its effect on performance of the IT environment. This allows an operator to make judgments as to whether the benefit is worth the cost. The model may also take into account the utilization of resources under certain conditions and may be used to determine any performance bottlenecks in the IT environment. The modeling phase is shown in greater detail in FIG. 2. At step 201, the model may be built, for example, using data from capacity management database (CDB) 202 that was collected in the monitoring phase. What-if scenarios may then be applied to perform, for example, utilization analysis (act 203), bottleneck analysis (act 205), and cost analysis (act 207). At act 209, corrective actions may be determined based on the what-if scenarios and these corrections may be implemented into the IT environment.

In optimizing phase 107, it may be determined which aspects of the IT environment may be tuned to better improve the performance of the IT environment. This may be done in any suitable way. For example, analysis of data from analyzing phase 103 may be used in modeling phase 105 to determine changes that improve overall performance.

In change initiation phase 109, changes that have been identified in analysis phase 103 and optimizing phase 107 as improving system performance may be introduced into the IT environment. This may be done in any suitable way, as the invention is not limited in this respect.

After changes have been introduced into the environment, monitoring phase 101 may continue, so that the impact of the new changes may be determined and the above-described capacity management process may repeat.

Figure 8:
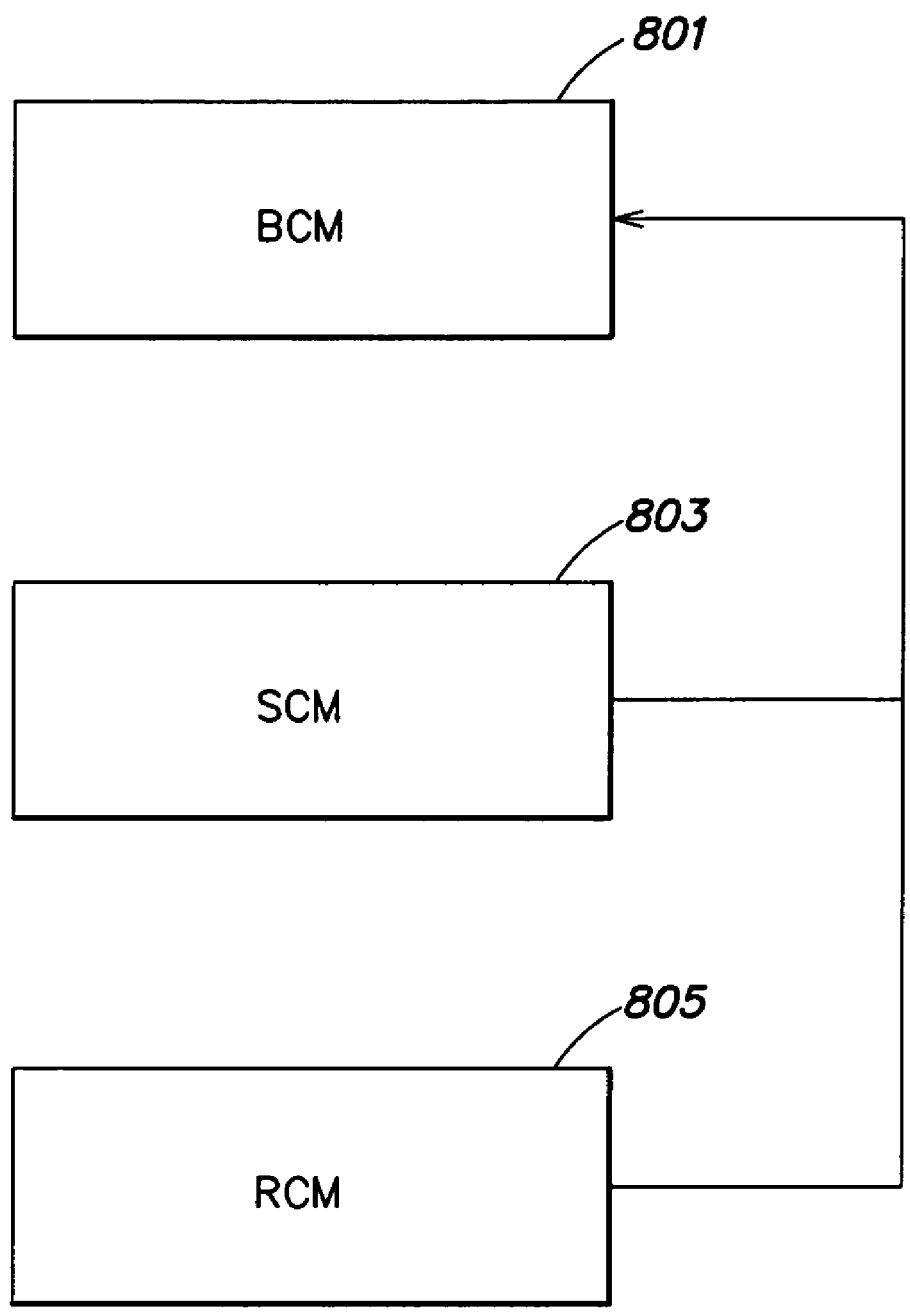
FIG. 8 is a block diagram illustrating a three-tiered approach to capacity management, wherein information derived from one tier may be used at another tier, in accordance with one embodiment.

In one embodiment, the above-described capacity management process of FIG. 1 may be performed at at least three conceptual levels: the business capacity management (BCM) level, the service capacity management (SCM) level, and the resource capacity management (RCM) level, with information derived from performing the process at one level being used in the process at other levels. For example, as shown in FIG. 8, the capacity management process may occur at BCM level 801, SCM level 803, and RCM level 805. Information derived from performing capacity management at SCM level 803 and/or RCM level 805 may be used at BCM level 801.

At the BCM level, current business, financial, economic, and technology indicators may be evaluated to determine future business load placed on the IT system by business needs. Scenarios to be considered at this level may include major changes to the business environment, such as, for example mergers and acquisitions.

At the SCM level, service-related issues are evaluated. For example, scenarios such as the seasonal ramp-up of certain resources to maintain system availability (e.g., to avoid excessive latency for an online toy store during the holiday season) may be considered.

At the RCM level, a goal is to manage the capacity and performance of individual components within the IT environment. For example, at this level the performance of a specific hardware device (e.g., a router) may be monitored. Scenarios such as the effect on amount of bandwidth on a particular subnet as a result of increased workstations on that subnet may be considered.

The Microsoft Operations Framework (MOF) provides guidance that enables organizations to achieve system reliability, availability, supportability, and manageability for a wide range of management issues pertaining to complex, distributed, and heterogeneous environments. MOF includes a number of service management functions (SMFs) that provide operational guidance for implementing and managing computing environments and other IT solutions. In one embodiment, instructions for implementing a capacity management process are provided as a MOF SMF, although embodiments of the invention described herein are not limited to use with MOF. The Capacity Management SMF is presented in accordance with the fundamental principles of MOF and may be fully integrated with other MOF SMFs. A complete description is provided in the published Microsoft Operations Framework version 3.0 documentation, which is herein incorporated by reference in its entirety, and is available at http://www.microsoft.com/mof.

Implementation of a Capacity Management SMF according to MOF will now be described, although the invention is not limited to implementation in this way or as a MOF SMF. The Capacity Management SMF helps organizations achieve and sustain the IT service capacity requirements they need to support their business at a justifiable cost. For the purposes of this document, the term "capacity" is one of convenience, which, depending on the context, may imply resource capacity, such as storage, processor speed, network, or human resources, or an end-to-end IT service capacity, such as messaging, customer relationship management (CRM), or order processing. Many of the principles and suggestions for best practices apply regardless of the type of capacity being optimized.

Capacity management is made up of three subprocesses: Business capacity management (BCM), Service capacity management (SCM), and Resource capacity management (RCM). These subprocesses all share a common set of activities that are applied from different perspectives. They include the following: Modeling, Service monitoring, Performance management, Demand management, Workload management, Analysis, Change initiation, Optimization, and Trend analysis.

Each of these subprocesses works toward the production and maintenance of a capacity plan and triggers requests for change through the appropriate channel. These activities all support the proper management of resources and service performance levels in order to conform to current and anticipated business requirements.

Goals and Objectives

The goal of capacity management is to optimize the capability of the IT infrastructure and supporting organization in order to deliver a cost-effective and sustained level of availability that enables the business to satisfy its objectives. For example, the right level of processor performance or storage capacity for a business-critical service needs to be carefully established in order to fulfill customer demand in a timely and cost-effective manner. The goal of capacity management is to continuously optimize existing and future IT resource demands and supply. Based on this optimizing goal, the capacity management process maintains a capacity plan and initiates requests for change that may result in environmental updates or new facilities. When new facilities are developed or purchased, they are released to operations to continue the cycle of effective operations.

Scope

The capacity management process should be the focal point for all IT performance and capacity issues. The overall responsibility for all capacity-related activity lies with a centralized or enterprise capacity management process. For both operational and developmental environments, the process should encompass the following: All hardware: From personal computers and file servers through mid-range computers, mainframes, and super-computers; All networking equipment: LANs, WANs, bridges, routers, and so on; All peripherals: Storage devices, printers, and so on; All software: Operating system, network, in-house developed, and purchased packages; Human resources: To the extent of maintaining sufficient staff capacity to prevent delays in end-to-end response time (for example, overnight data backups not being completed in time because no operators were present to load tapes).

Note: In general, human resources management is a line-management responsibility described elsewhere. For more information, see the Workforce Management SMF at http://www.microsoft.com/technet/itsolutions/cits/mo/smf/smf-wrkmg.mspx.

Vital business operations should continue in the face of any IT disruption, whether planned or unplanned. Recovery needs to be accomplished quickly and reliably, so failures must be as transparent as possible to the customer. If the IT operation is global, then corporate IT should have a global vision and implement the appropriate, cost-justified solution. Corporate data centers, distributed servers, personal computers, and the enterprise network resources need to be considered in order to remain responsive and competitive in a global economy.

It is important for the capacity management role to work with other management teams and disciplines. Capacity management provides feedback to service continuity management and works with the availability management, risk management, and financial management process owners to design new solutions when failover and recovery measures are implemented.

Key Definitions

Availability. The amount of time an application is available to perform work, typically measured in percentage uptime.

Capacity. A capability that is required for delivering the agreed-upon performance at the required service level and cost.

Capacity management. Responsible for ensuring that IT processing, storage, and network capacity matches the evolving demands of the business in the most cost-effective and timely manner.

Capacity management database (CDB). Contains the detailed technical, business, and service level management data that supports the capacity management process. The resource and service performance data in the database can be used for trend analysis and for forecasting and planning.

Capacity plan. The consolidated output of a capacity management process. The capacity plan documents current levels of resource utilization and service performance. After considering business requirements, it forecasts future resource requirements for IT services to support them. The capacity plan recommends the resource levels and changes necessary to accomplish operating level requirements that support the service level agreement (SLA). The capacity plan includes the cost and benefit of those resources, reports of their compliance to the IT SLA, and the priority and impact of systems and resources on the overall business and the IT infrastructure.

Demand management. Responsible for ensuring that the future business requirements for IT services are considered, planned, and implemented in a timely manner. The capacity management staff can achieve this by analyzing current resource utilization of the various IT solutions and generating trends and forecasts. These future requirements come from account management, which constantly probes current and future customer needs.

ITIL (IT Infrastructure Library). A widely accepted approach to IT service management. ITIL provides a comprehensive and consistent set of best practices for IT service management, promoting a quality approach to achieving business effectiveness and efficiency in the use of information systems. ITIL is based on the collective experience of commercial and governmental practitioners worldwide. This has been distilled into one reliable, coherent approach, which is fast becoming a standard used by some of the world's leading businesses. For more information on ITIL, see http://www.itil.co.uk/.

Workload management. Responsible for translating customer demands into workloads required by IT solutions (the various applications used to create the actual solution) so that the required resources can be determined from this analysis. The process translates both current and future demands to workloads.

Managing Business Requirements

One of the objectives of capacity management is to deliver best practices that establish a communications framework between IT operations and the business. This is essential for ensuring that the capacity management process works toward meeting the business capacity requirements. The typical problem is that IT operations often works with measures of computer performance, megabytes of storage, or other expressions of capacity or throughput. At the same time, the business is using expressions such as sales effectiveness, market share, time to market, profit, cash flow, and return on investment (ROI). (For more information on ROI, see the Financial Management SMF guide at http://www.microsoft.com/technet/itsolutions/cits/mo/smf/smffinmg.mspx.) This different terminology can lead to a misalignment between the business needs and the levels of IT service provision. In order to avoid such a misalignment, the capacity management process defines a subprocess dedicated to business capacity management. This is an ongoing process that reviews and captures business requirements and then translates them into a consistent terminology that can be used to direct service and resource capacity management activities as well as to update the capacity plan and CDB appropriately.

Service level management (SLM) assists the process of managing business requirements by placing a "business value" on a particular service. The IT organization can then plan to meet the needs of that service. This in turn creates operating level requirements (OLRs) for each IT function. An OLR is an agreed-upon, measurable service metric "target" between two or more IT entities, applied to the services provided to those entities and described in an OLA.

An operating level agreement (OLA) is an internal agreement between two or more IT entities. The OLA defines the responsibilities of all participating parties within IT and binds these parties to provide a particular service. The parties agree to specific levels of quality and quantity of services provided. It is similar to an SLA, but is normally not as formal. The OLA should have its metrics stored in the CDB.

Defining Operating Level Requirements

Capacity management is part of the Optimizing Quadrant in the MOF Process Model. This quadrant recognizes that running IT operations successfully is a prerequisite to achieving business success and operational efficiency. The Optimizing Quadrant addresses, among other things, two specific elements of operations: Business Service Reliability; and Cost.

The service level management process is formalized by service level agreements (SLAs). Service level agreements must directly reflect business requirements, IT capabilities, and appropriate levels of cost. Therefore, IT must be rigorous in determining what levels of service it can reasonably agree to deliver within capability and budget. IT must then create and maintain metrics to measure the services provided. Services that cannot be measured do not meet a metric and must not be included in an SLA. (For more information, see the MOF Service Level Management SMF guide at http://www.microsoft.com/technet/itsolutions/cits/mo/smf/smfslamg.mspx.)

Customer expectations may exceed technical capability, so it is essential that customer expectations for new applications be managed from the outset. Capacity management provides an effective opportunity to balance customer expectations with cost and available resources to achieve appropriate and achievable target performance levels.

It is useful to break down the end-to-end provision of any service into manageable pieces and to examine each of these pieces in turn. Microsoft Operations Framework breaks down the overall infrastructure that makes up and supports an IT service into the following IT categories: Service; Application; Middleware (includes database); Operating system; Hardware; Network (local area network); Facilities; and Egress (service supplied outside of IT—for example, power and water).

This means that for each IT category identified above, operating level requirements should be generated and documented to ensure that the overall SLA is met. Some IT categories may have little, if any, impact on the delivery of a given service. Others may have a significant impact on the ability of IT to satisfy the SLA. The important thing is to thoroughly and carefully evaluate the impact that each IT category has on the overall delivery of service.

Establishing Quality of Service Metrics for Capacity Management

Effective capacity management ensures that appropriate IT resources are available when needed. With the proper management systems and tools in place for monitoring existing resource usage, thresholds can be set to alert the IT organization when conditions may indicate or lead to performance or availability issues. With the rapidity of change common in many business environments, capacity management needs to put proper tools in place to remain proactive. This includes using predictive modeling and "what-if" scenarios to estimate appropriate levels of resources and anticipating the level of performance needed to satisfy business requirements. Specific review milestones are defined and refined with the effective coordination of the service level, financial, workforce, service continuity, availability, and capacity management processes.

Success in capacity management is dependent on a number of factors: Availability of accurate and timely business forecasts; Understanding of current and future technologies.

Effective benefit measurement, cost analysis, and justification; Communication and interaction with other service management processes; and Planning and implementing an appropriate level of resources to match business need.

The capacity management process needs to manage its own quality and effectiveness in order to improve its operation wherever possible. Quality of Service QoS) metrics are essential for this. Success or failure of the overall process can be measured by examining the following QoS areas.

Business Forecasts:
  Timely production of workload forecasts.
  Accuracy of business trend forecasts.
  Incorporation of business plans into the capacity plan.

Technology:
  Monitoring of performance and throughput of all services and components.
  Deploying new technology in line with business requirements (time, cost, and functionality).
  Maintaining SLAs regardless of problems with support or performance of old technology.

Cost-Effectiveness:
  Reducing or eliminating panic buying.
  Limiting over-capacity that cannot be justified in business terms.
  Accurately forecasting planned expenditure.

Alignment to Business Need:
  Reducing the number of incidents due to poor performance.
  Reducing the amount of lost business due to inadequate capacity.
  Implementing new services that match service level objectives.
  Acting on the recommendations made by capacity management.

For each of these QoS metrics, capacity management should define goals and then monitor the realization of them. The capacity manager must improve the process and manage it in such a way that the stated goals can be reached within the defined time frames.

Processes and Activities

Process Flow Summary

Capacity management is a continual process with several activities that are performed throughout the process. In order to keep this document brief, only a selection of the core capacity management tasks of this SMF have been chosen for a more detailed explanation.

FIG. 1 illustrates capacity management as an iterative process including five phases: monitoring; analysis; modeling; optimizing; and change initiation.

Monitoring

Capacity management involves the internal operating level requirements and associated metrics for each of the key IT layers that contribute to the overall SLA. It is important that the utilization of each resource and service be monitored on an ongoing basis to ensure that hardware and software resources are being used optimally and that all agreed-upon service levels can be achieved.

Most monitoring tasks are near-term in nature and rely on underlying tools and principles for operation. The collected information must be recorded or sampled over a determined period. The amount of sampling and resources required to do so must also be examined. The capacity management database (CDB) should contain information points to identify historical trends and patterns. For more information, see the MOF Service Monitoring and Control SMF guide at http://www.microsoft.com/technet/itsolutions/cits/mo/smf/smf-smc.mspx.

Data must be gathered not only at the total resource utilization level, but also at a more detailed level for the workload on each particular resource. This must be carried out across the whole infrastructure, including applications, servers, and networks. Similarly, data must be collected for each service—for example, availability and user screen response time.

Part of the monitoring activity is from a baseline, or profile, of the normal operating levels. If thresholds beyond the norm are exceeded, alarms are raised and exception reports are produced. These thresholds and baselines are determined from the analysis of previously recorded data and can be set on:

Individual components—for example, monitoring the utilization of a CPU to see that it does not exceed 80 percent for a sustained period of one hour.

Specific services—for example, making sure that the presentation time of a Web page does not exceed three seconds or the transaction rate does not exceed 1,000 transactions per minute.

It is also important to remember that monitoring takes up system capacity and thus can influence the performance of the system. Focus performance measurement and monitors on client SLAs. Operating level requirements and other necessary elements for monitoring often fall out of their overall contribution to meeting the SLA. Monitor at successive levels of control (for example, the key IT layers: network, operating system, hardware, application, and so on) to make sure that the operating level requirements are met.

Analysis

As explained previously, the key IT layers can be helpful in identifying components that can be monitored and tuned:

Service
Application
Middleware
Operating system
Hardware
Network
Facilities
Egress In this phase, data monitored and collected is analyzed and used to carry out tuning exercises and establish profiles. These profiles are important since they allow the proper identification and adjustment of thresholds and alarms. When exception reports or alarms are raised, they need to be analyzed and reported upon, and corrective action needs to be taken. Ideally, all thresholds should be set below the level at which the resource is over-utilized or below the targets in the operating level agreement (OLA) or layered operating level requirements (OLRs). By doing this, capacity management can take corrective action before the targets in the OLAs have been breached or the resource has become over-utilized, causing a period of poor performance or failure.

The organization's service catalog should be reviewed for service capacity business impact analysis (BIA), ROI analysis, and capacity implications for IT service continuity planning, and as an initial baseline for workload-related issues and demand-management feedback.

The data collected from the monitoring information should be analyzed to identify trends from which the normal utilization and service level, or baseline, can be established. By regularly monitoring and comparing this baseline with current resource usage, exception conditions in the utilization of individual components or service thresholds can be defined, and breaches or near misses in the OLAs can be reported. In addition, the data can be used to predict future resource use. Analysis of the data may identify the following issues:

Contention (data, file, memory, processor)
Inappropriate distribution of workload across available resources
Inappropriate locking strategy
Inefficiencies in the application design
Unexpected increase in transaction rate
Inefficient use of memory The use of each resource and service must be considered over short-, medium-, and long-term periods, and the minimum, maximum, and average utilization during these periods must be recorded. Typically, the short-term period covers utilization over 24 hours, the medium-term period may cover from one to four weeks, and the long-term period covers a year or more. Over time, trends in the use of the resource by the various IT services become apparent.

One key to determining whether a solution is operating at an acceptable level is latency, or the length of time a user has to wait for a response once a request for information is made. Heavy workload on a server might create unacceptable wait times even though the server may be capable of handling every request. As a rule, try to isolate components that have repeatable, high percentage contributions to performance levels and report them at varying workloads.

It is important to understand the utilization levels in each of these periods so that changes in the use of any service can be related to predicted changes in the utilization level of individual resources. The ability to identify the specific hardware or software resources on which a particular IT service depends is improved greatly by an accurate, up-to-date, and comprehensive configuration management database (CMDB). Any relevant detail performance information should be maintained in the related but separate capacity management database (CDB).

When the utilization of a particular resource is considered, it is important to understand both the total level of utilization and the utilization by individual services of the resource.

Modeling

Modeling is a central element of the capacity management process. Modeling techniques and effective use of simulation software make it possible to investigate capacity planning "what-if" scenarios in order to build a model that simulates the desired outcome.

Figure 2:
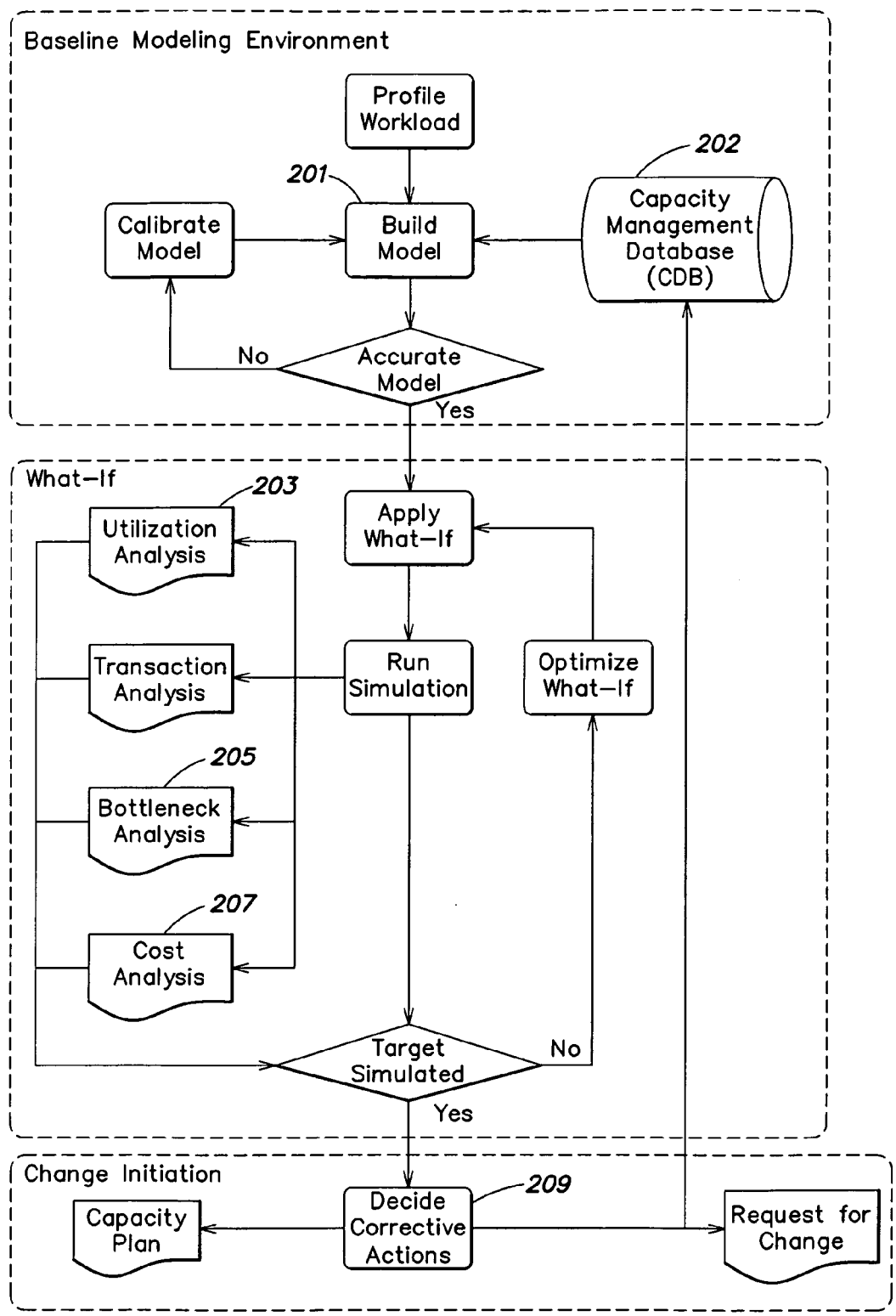
FIG. 2 is a flow diagram illustrating an example of a modeling process for an information technology (IT) environment, in accordance with one embodiment.

Modeling relies on data from other capacity management subprocesses and activities, particularly forecasts of workloads and the use of resources by applications in development, and associated hardware specifications. Modeling should enable capacity (least cost) "value" decisions to be made from trend analysis. It can involve estimations based on past figures (trending), but it is much better and more accurate to make decisions on the results of techniques such as Transaction Cost Analysis, or simulation of the actual application. (For more information, see "Using Transaction Cost Analysis for Site Capacity Planning" at htttp://www.microsoft.com/technet/prodtechnol/comm/comm2002/plan/cs02tcas.mspx.) FIG. 2 summarizes the modeling process and shows the three suggested stages to modeling: baselining the modeling environment, running "what-if" scenarios, and initiating changes to the services or resources being modeled.

Analytical modeling, with algorithms based on IT service data, typically involves elaborate software that generates predictive and proactive capacity information. Simulation modeling is usually more accurate than analytical modeling since it provides greater capabilities and more closely emulates the application. However, simulation modeling may require significantly more time and cost to prepare scripts and generate realistic transaction loads. Specialized software that captures user interaction and plays back this activity at varying levels can make this type of modeling more cost-effective. Establishing a "baseline model" that accurately reflects the performance levels and workload characteristics of the current system is an important first step. This can allow predictive "what-if" scenarios with planned changes to resources under a variety of workloads. A good prediction of performance levels depends on the accuracy of the baseline model and its ability to accommodate and reflect changes required for the predictive model. Each "what-if" iteration generates several reports, which should be analyzed to see if the desired outcome has been achieved.

Modeling, in its simplest and least expensive form, provides estimates based on experience and current resource utilization. This may be most practical for day-to-day small decisions. Pilot studies, prototypes, or full-scale benchmarks may be more appropriate for larger projects in which cost and time are justified. Certain architectural approaches to hardware and software deployment—for example, lower cost of pooled redundant storage—may be a method of gaining scalability without significant change to the environment. Effective pilot testing needs to include functional testing of as many variables as can be reasonably isolated for control. Testing needs to be persistent and constant over a specified time frame. There should also be a stress test, if feasible, to push the solution until it "breaks." This helps in understanding the limiting resource components involved in the solution. Most capacity management activities should be run as projects and have an IT operations management sponsor with sign-off authority, who coordinates closely with the design and end-user community.

Optimizing

Analysis of the monitored data may identify areas of the configuration that could be tuned to better use the system resource or improve the performance of the particular service.

Optimizing techniques that can be helpful include:

Balancing workloads. Transactions may arrive at the host or server at a particular gateway, depending upon where the transaction was initiated. Balancing the ratio of initiation points to gateways could provide tuning benefits.

Balancing disk traffic. Storing data on disks efficiently and strategically—for example, striping data across many spindles—might reduce data contention.

Defining an accepted locking strategy. Specifies when locks are necessary and the appropriate level—for example, database, page, file, record, and row. Delaying the lock until an update is necessary may provide benefits.

Efficient use of memory. May include using more or less memory, depending upon the circumstances. A process may use resources more efficiently if data is read into memory and manipulated there instead of being manipulated directly on the disk. Alternatively, many processes may be competing for memory resources. The excessive demands may lead to increased CPU utilization and delays while pages are swapped in and out of memory.

Establish effective tuning guidelines that anticipate the growth by analyzing existing capacity information. Beware of supplier or direct vendor control of their package, hardware, or service. Especially, do not allow the vendor to tune any systems unless appropriately overseen by a qualified member of the IT organization or capacity management staff.

To achieve acceptable transaction response time under maximum load conditions, tune the system to optimize system resources. Trend analysis of monitored data must also project anticipated growth trends. Systems should be designed and implemented with this growth in mind.

During the design or building of a new application or system, there are often recommendations for tuning that should be examined. These recommendations are oftentimes available through application sizing tools. Flexible architectures are often better investments since they can expand or be tuned in the main areas of CPU, memory, disk or I/O speed, or network bandwidth. For example, a database transaction log file is written sequentially, often at the same time as data elements. By separating them, the log file on a disk is protected and optimized for write (for example, a separate mirrored pair), and the performance and availability of the database is improved. Likewise, the speed of striping many disks—for example, redundant arrays of independent disk (RAID) levels—can vastly improve the data and index performance and provide tuning options as well. It is a good practice to consult hardware and software platform white papers or technical notes for additional techniques to improve the design for capacity and tuning of the total solution after its deployment.

As mentioned previously, these optimizing recommendations are typically obtained through the use of application sizing tools. Alternatively, a general-purpose modeling tool may be used to perform a what-if analysis.

Change Initiation

Change initiation introduces to the service in production any changes that have been identified by the analysis and tuning activities. This activity includes the identification of necessary change, and subsequent generation and approval of a change request. In some cases, implementation of the change runs concurrent to the service; in other cases, the type of change may require the service to be temporarily stopped.

A slow, controlled pace for the entire change process is recommended. Reduce the number of variables in the implementation to improve the process.

The implementation of any change should be done through formal change management processes. System tuning changes can have major implications for customer satisfaction. The impact and risk associated with these types of changes are likely to be greater than most other types of changes. Implementing tuning recommendations under strict change management procedures results in:

Less adverse impact on the customers of the service.

Increased customer productivity.

Increased productivity of IT personnel.

Reduction in the number of changes that need to be backed out, as well as the ability to do so more easily.

Greater management and control of business-critical application services.

It is important that further monitoring takes place to assess the effects of the change. It may be necessary to make additional changes or to back out some of the original changes.

Techniques of switching out an individual server (N+1) or a set of servers (N+N) to ensure smooth transition or "rolling updates" during change should be balanced with the cost. However, do not underestimate the cost of downtime, which can often justify this approach to implementing capacity change.

In conclusion, effective implementation of capacity management requires careful analysis and a thorough understanding of the operation of the business, its processes, and the underlying causes for the use or non-use of capacity. Costs are assigned appropriately to the capacity categories according to the cause of capacity and type of cost.

Monitoring, analysis, tuning, and change initiation (through change management) activities are iterative for both resource and performance management. For more information, see the MOF Job Scheduling, Storage Management, Service Monitoring and Control, and Network Administration SMF guides.

Capacity Management Subprocesses

Figure 3:
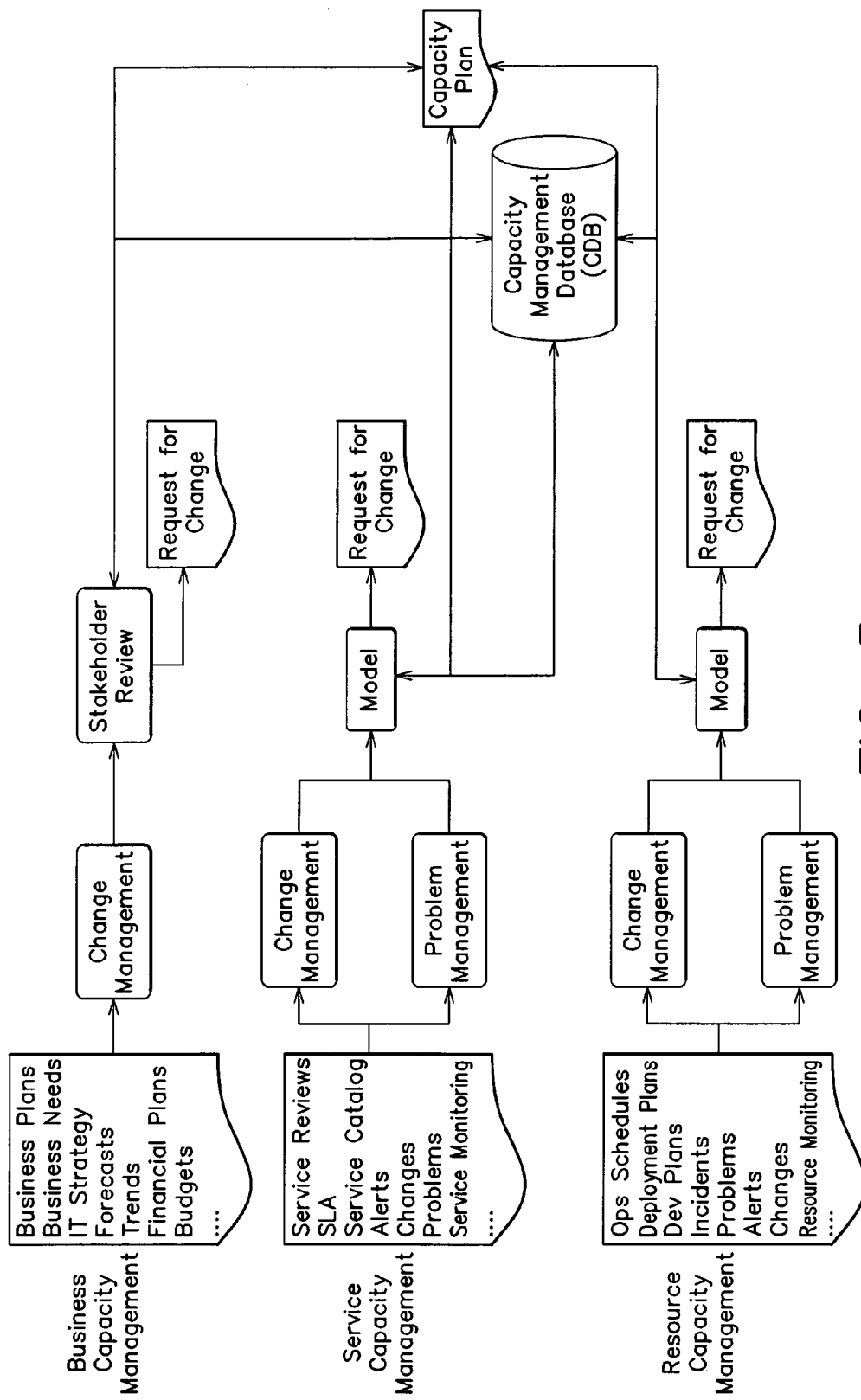
FIG. 3 is a flow diagram illustrating a three-tiered approach to capacity management, in accordance with one embodiment.

It is useful to consider capacity management as taking place at three levels within an organization: business capacity, service capacity, and resource capacity. Within the IT service management function, capacity planning is used as a tool to help decision makers optimize their choices, not just as a justification to buy more hardware. The Capacity Management SMF presents an end-to-end process that clearly demonstrates to users how to apply this, through the presentation of realistic business scenarios. FIG. 3 shows all three capacity management subprocesses and how they interact with the CDB and capacity plan.

Business Capacity Management

Figure 4:
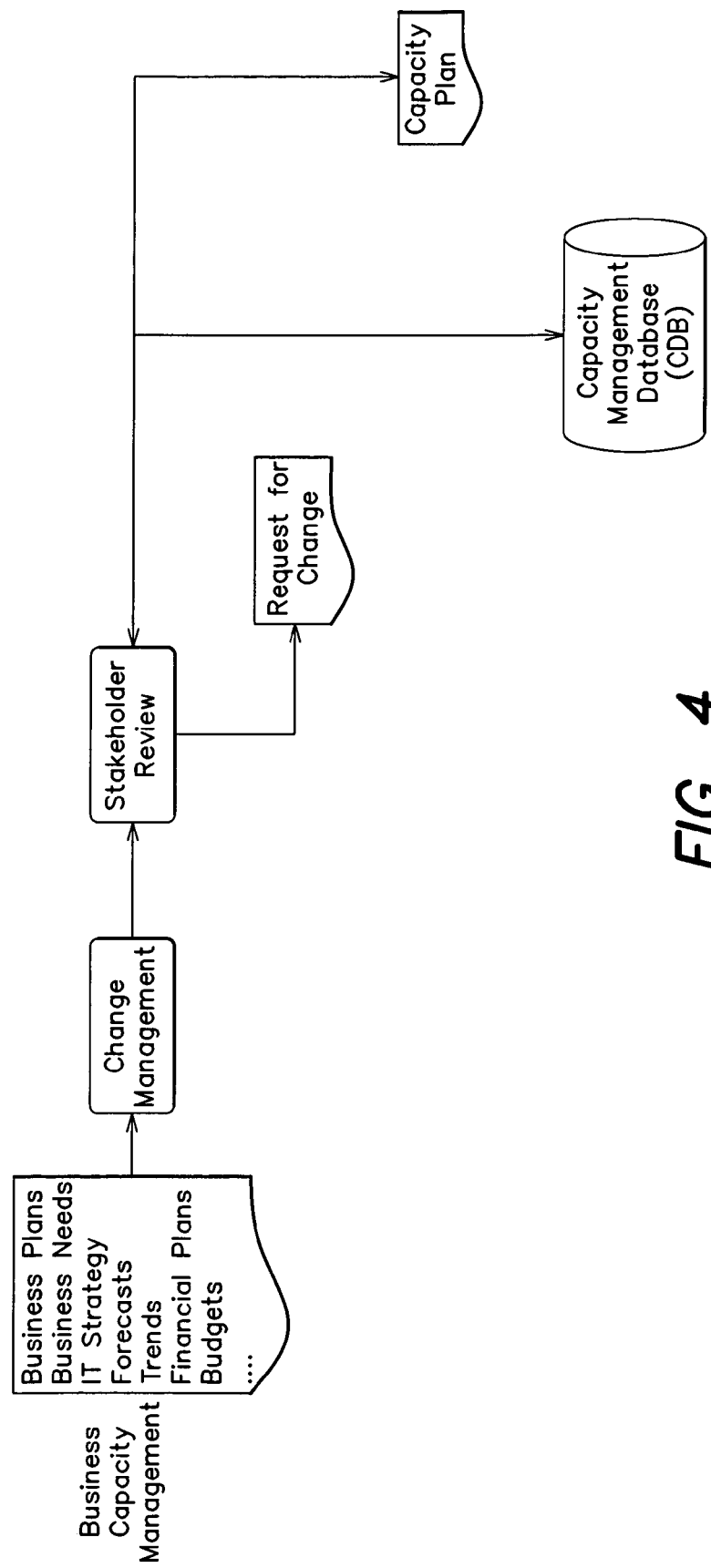
FIG. 4 is a flow diagram illustrating a business capacity management process, in accordance with one embodiment.

At the business capacity management (BCM) level, executives and other stakeholders evaluate current business, financial, economic, and technology indicators, with the goal of forecasting future business load placed on the IT system by business needs. This occurs at a corporate level, integrates with input from the other SMFs, and acts as input to the infrastructure engineering and enterprise architecture processes. The goal is to plan and implement projects to achieve necessary capacity on time and at an appropriate cost and risk. Scenarios at this level may include major changes to the business environment, such as business acquisitions or mergers. Inputs for BCM come from changes to a business plan, forecast, trend, or business need or through a periodic business review. FIG. 4 illustrates a process for business capacity management.

The stakeholder review activity is where representatives from the business share and review each other's high-level business plans. These plans are compared against the existing capacity plan and, if appropriate, the capacity plan is updated. A representative from IT should be present at this review to manage any major changes that need immediate action (using an RFC) and to update the CDB. The deliverable from this subprocess is an updated capacity plan.

Service Capacity Management

Figure 5:
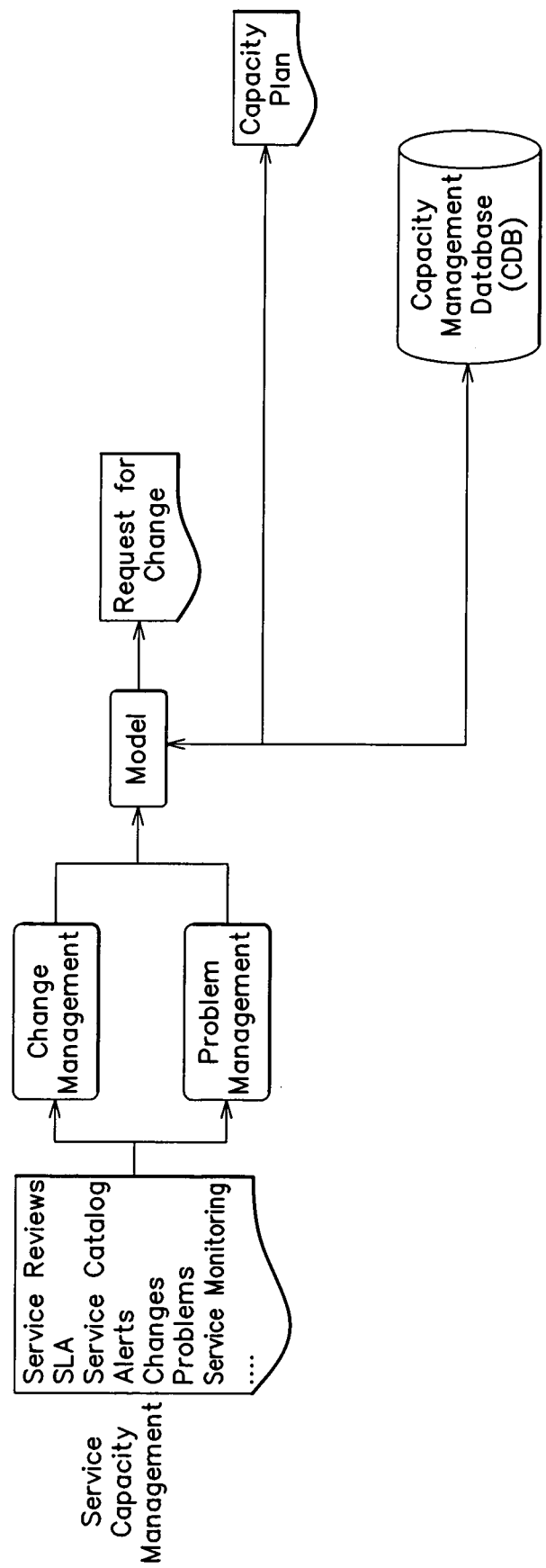
FIG. 5 is a flow diagram illustrating a service capacity management process, in accordance with one embodiment.

At the service capacity management (SCM) level, the organization evaluates and bases short-term strategy and tactical response to service-related issues and needs. The goal is to profile and meet the needs of specific services on an end-to-end basis in order to remain in compliance with service level agreements. For example, recurring alerts for a certain set of events may indicate a technical issue that needs addressing, such as network congestion due to a faulty network switch, or may indicate a more process-oriented issue, such as unanticipated levels of online activity. Decisions at this level may be strategic or reactive in order to solve an immediate problem. Applicable scenarios may include the seasonal ramp-up of selected IT resources to maintain system availability (for example, to avoid excessive latency and user time-outs for an online toy store sales system in the two weeks before Christmas). FIG. 5 illustrates a process for service capacity management.

The triggering events for service capacity management would come either from the change management process (as part of planning to implement a change to an existing service or to add a new service) or as the result of a known problem that affects service capacity. The service capacity management process may also recur periodically as a result of an operational management review.

The outputs from this subprocess would be requests for change to the infrastructure or components as well as the updating of the capacity plan and CDB.

Resource Capacity Management

Figure 6:
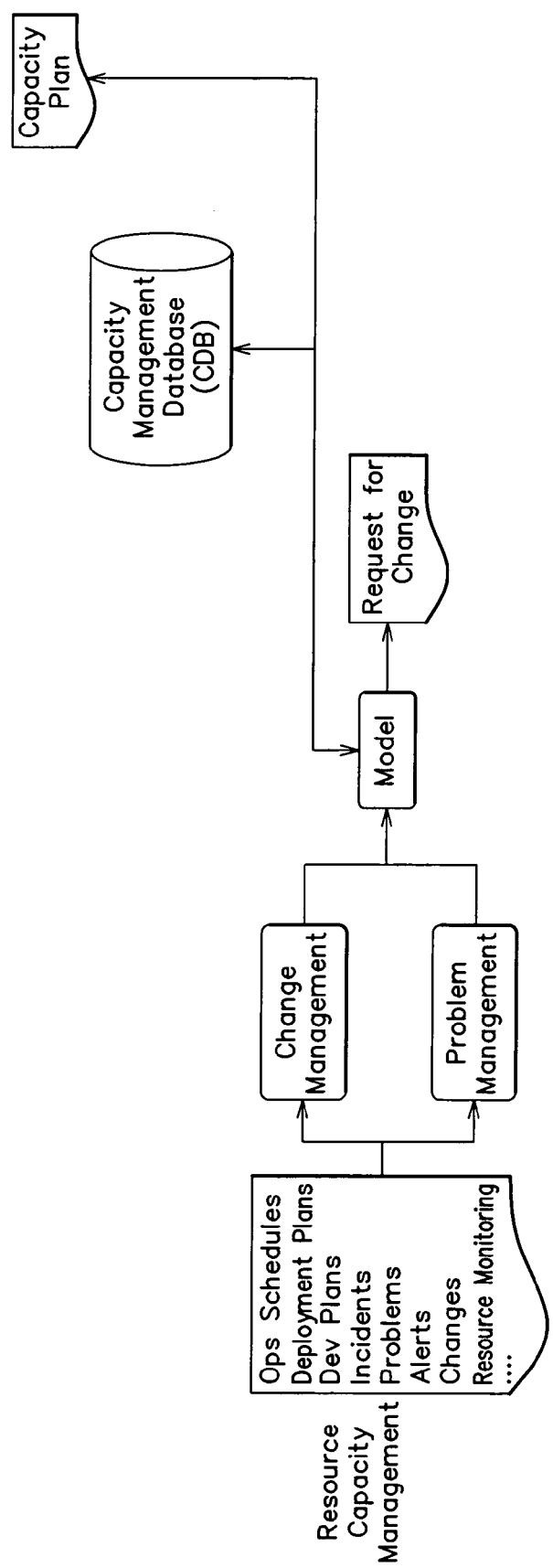
FIG. 6 is a flow diagram illustrating a resource capacity management process, in accordance with one embodiment.

At the resource capacity management (RCM) level, decision making typically occurs in a more reactive or tactical mode. The goal is to manage the capacity and performance of individual components within the infrastructure. Tasks initiated by capacity issues at this level may include hardware or monitoring optimization, service rescheduling, or other short-term or immediate actions. An example of an applicable scenario at this level would be bandwidth issues on a subnet where a department has just increased headcount and workstations. Inputs for SCM and RCM include the outputs from the Problem Management SMF that are attributed to capacity management issues, requests for change from change management that may affect capacity requirements, and the results of regular operations management reviews with capacity components. FIG. 6 illustrates a process for resource capacity management.

The outputs from this subprocess would be requests for change to the infrastructure or components as well as the updating of the capacity plan and CDB.

Roles and Responsibilities

Figure 7:
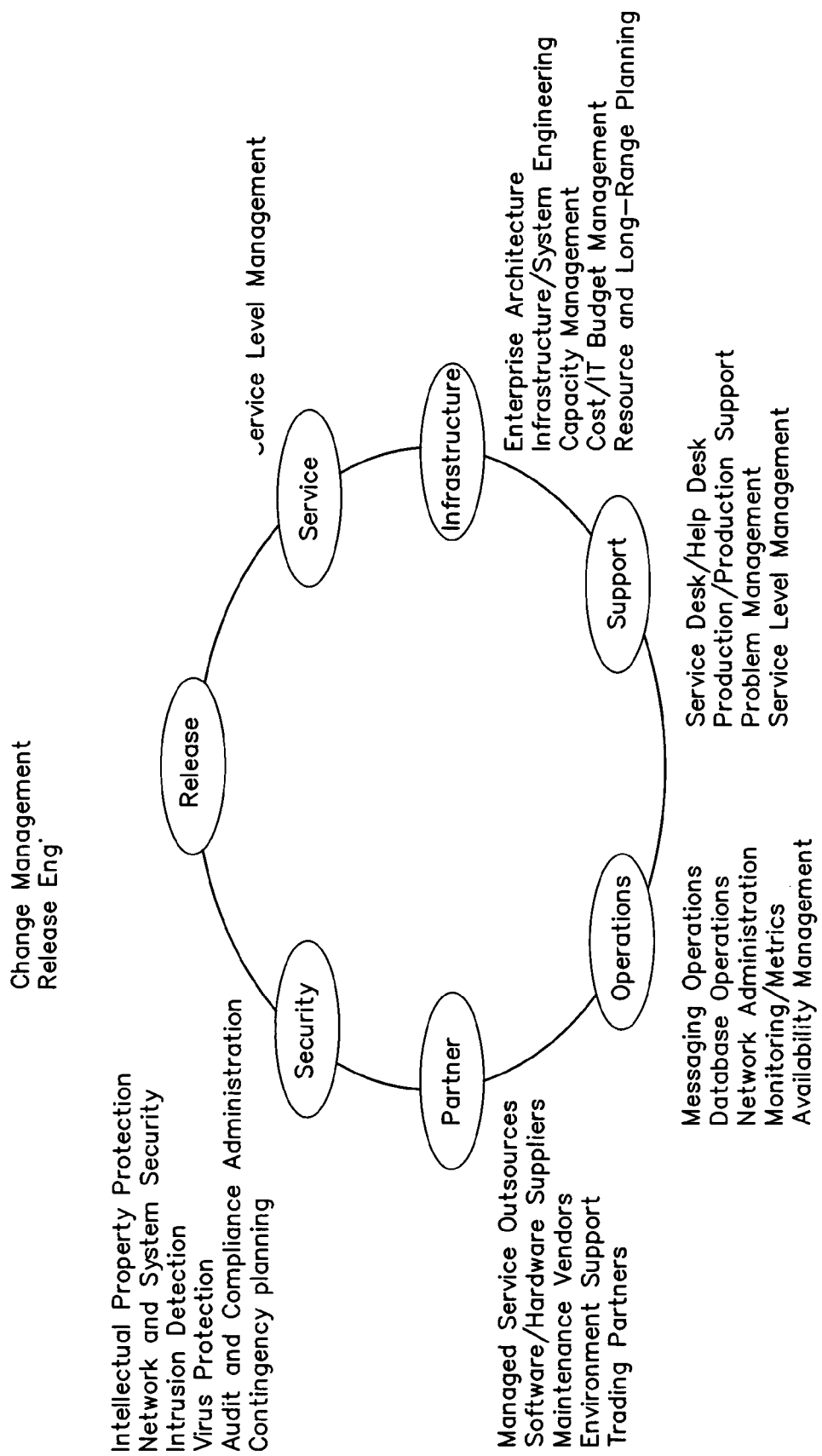
FIG. 7 is a diagram illustrating role clusters in the Microsoft Operations Framework (MOF) which may be used in the management of an IT environment.

As illustrated in FIG. 7, the MOF Team Model organizes the activities of IT operations into seven distinct role clusters that represent areas, or functional roles, within IT operations. For more information on the Team Model, see the "MOF Team Model for Operations" white paper at http://www.microsoft.com/mof.

Within the context of the MOF Team Model, the principal roles and their associated responsibilities for capacity management have been defined in this document according to industry best practice. This section outlines the roles and responsibilities of the capacity manager. The capacity manager role owns the capacity management process. It is important to note that this is a role, not a job description. In a small organization, one person may perform several roles, including capacity management, while a large organization may have a team of people designated just for capacity management. For example, a larger organization may have specialist coordinators and a staff of people assigned the job of carrying out the directives they receive from the capacity manager. It is recommended, however, that only one person perform the capacity manager role.

Capacity Manager

The capacity manager role is part of the Infrastructure Role Cluster within the MOF Team Model. (The Infrastructure Role Cluster is responsible for conducting long-term planning to ensure that plans are in place to meet the new and changing requirements of running the business from a networking, telecommunications, hardware, and software perspective.) The capacity manager role oversees the allocation and delivery of service capacity to users. The capacity manager is responsible for planning, monitoring, and reporting activities relating to system and solution capacity, performance measurement, and forecast in the IT organization.

The capacity manager may have many associated activities, which often include:

Forecasting future service capacity requirements.
Ensuring that capacity targets can be achieved at a reasonable cost.
Assisting in the creation and review of new service level agreements (SLAs).
Providing consulting expertise for the review and creation of any external contracts that include capacity clauses.
Use of modeling tools and other capacity planning techniques.

The capacity manager is also responsible for managing the day-to-day capacity requirements of services, including:

Establishing batch job standards (batch skeleton).
Establishing the batch schedule.
Changing the scheduling calendar (for example, no runs during holidays).
Making changes to the batch schedule and testing the new schedule.
Monitoring the batch process.
Monitoring the success or failure of batch jobs.
Monitoring resource availability and performance.
Capturing metrics and creating performance reports.
Tuning batch-processing performance and submitting requests for change as necessary.
Troubleshooting and correcting or escalating job errors.
Assisting incident/problem management in the correction of errors that are escalated.
Reviewing, testing, and conducting as-needed requests.
Submitting RFCs for schedule changes and the addition or removal of jobs from batch runs.
Ensuring high availability (24×7).

Relationship to other SMFs

Capacity management is a service management function (SMF) in the Optimizing Quadrant of the Microsoft Operations Framework Process Model. It follows the MOF SLA Review milestone. The process is at a tactical level to assure quality of service for solutions offered by IT. Capacity management also manages the capacity change process, providing necessary design and planning feedback to planning activities described in the Microsoft Solutions Framework (MSF).

Capacity management initiates ongoing improvements to IT service capacity and performance by delivering recommendations and management information plans and reports and by monitoring and controlling IT services. It also works to specify and refine requirements resulting from service level agreements (SLAs) that, in turn, drive operating level agreements (OLAs) internal to IT organizations. Capacity management's core relationship is with service level management. It capitalizes on cost management for most of its recommendations and, for its normal optimization, is tightly coupled to availability management. Capacity management also provides input for contingency planning. For more information, see the MOF Service Level Management, Financial Management, Availability Management, and Service Continuity Management SMF guides.

The capacity management process focuses on the appropriate capacity or performance levels of new technologies, existing applications, underlying system software and hardware, supporting tools, and associated documentation. Insufficient or degraded capacity can severely impact the availability of a service. Capacity and availability management functions often share common staff and management information tools. There is a need for coordination of related activities since they share similar management data views, vendor-supplied software, and a common goal of minimal disruption to a service due to change.

The planning, decision-making criteria, and successful implementation of a recommended change required for capacity in the IT environment depends on the coordination of many related activities within the organization. MOF has service management functions (SMFs) that suggest strategies for improved coordination of IT operations. This section outlines the relationship of capacity management to these specific MOF SMFs.

Infrastructure Engineering

Infrastructure engineering establishes a process by which the engineering and development groups within an organization communicate with the operations group, primarily to ensure that new applications or other acquisitions will be compatible and consistent with the existing infrastructure. This service management function also includes the development of infrastructure standards for a variety of IT and environmental components. Within the context of capacity management, adherence to the communication process and standards will ensure that new engineering projects will not adversely affect infrastructure capacity.

Financial Management

Capacity management creates upgrade plans that are included in the budgeting process. Accurate cost information is vital in order to accurately budget capacity upgrades. Planning for capacity management entails the planning for new hardware and software. These costs should be incorporated into the annual budget. Costs may be the restraining factor in some decisions and affect SLA negotiation. By effectively estimating the cost of service availability and optimizing capacity, IT weighs risk versus cost to identify the countermeasures they can afford to implement and those that should be reserved as contingency plan scenarios. Sometimes the return on investment for a requested change may need to be demonstrated. Capacity management must ensure that the necessary resources are acquired and implemented in a cost-effective manner. For more information, see the MOF Availability Management and Service Continuity Management SMF guides.

Service Level Management

Agreements between the provider and consumer of IT services exist within many organizations, yet in some they are unofficial, taken for granted, or unclear to one or both parties involved.

Review and preparation of SLAs is a primary activity of service level management. Capacity management also helps define OLAs that result from service level requirements. IT must prioritize service alerts and countermeasures to prevent degradation of performance before it affects availability. Capacity management interacts closely with service level, availability, service continuity, and financial management staffs to decide on the cost-justified proactive measures required to improve the quality of service.

Availability Management

Availability management ensures optimal availability of IT services through the correct use of resources, methods, and technology. Capacity management has a very close tie to this process, since optimal use of IT resources to meet performance levels at a justifiable cost relates to the goal of higher service availability. Shared reports should highlight trends indicating capacity or performance issues. Management information tools are typically leveraged to provide the monitoring information required for both processes.

The availability plan needs to be coordinated with the capacity planning process. The same technology solution can often meet the needs of both plans. The availability and capacity plans should be created in collaboration. Some solutions that cannot be cost-justified for one plan may be justified in combination with the other.

Service Continuity Management

Service continuity management copes with, and recovers from, unplanned situations in which the period of IT service disruption is considered unacceptable and normal availability countermeasures have not succeeded. There is a difference in scope of effect and the unacceptable nature of the disruption. Availability management deals more practically with what IT can effectively manage as part of its routine operation, but principles, approach, and concerns are similar. Both processes depend on input from capacity management to judge the level of performance when the countermeasures are enacted.

Storage Management

Storage management covers the day-to-day activities required to effectively operate and maintain storage management in an IT environment. It is a key SMF of the overall system administration process. Data backup, restore, and recovery operations are addressed. The SMF describes detailed components of capacity or performance monitoring. It presents specific aspects of Microsoft Windows® 2000 storage-related capacity and performance "how to."

Job Scheduling

Job scheduling covers the day-to-day capacity-related activities involved in batch job processing. The job scheduling process is concerned with the details of batch job control, monitoring, and tuning. It is an example of capacity management practice applied to day-to-day operations. Capacity management sets requirements for job administration, workload, and performance expectations.

Network Administration

This SMF provides network usage, bandwidth, and trend analysis to provide predictive capacity planning information accessible from a central facility that may populate the capacity management database (CDB). Capacity management draws on this data as input to provide demand management information and proactive recommendations. One of the functions of network administration is to provide tools that monitor network service usage. These tools help to quantify IT service capacity and availability. As components of capacity management, proper workload and demand management of network bandwidth rely on best practice network administration activities.

System Administration

System administration covers the ongoing operating activities required to implement change and effectively operate and maintain IT service and component system capacity and performance levels.

The system administrator may make an approved capacity change; however, capacity recommendations need to be dictated by capacity management or job scheduling staff and the delegation controlled by their functional requirements.

Change Management

Capacity management assesses the impact of changes on existing capacity and identifies additional resource requirements based on the change in demand. Changes required for capacity management are implemented typically through planning and recommendations that result from capacity, availability, service continuity, and workforce management. Near-term daily operational changes may surface as job scheduling accommodates the more routine capacity changes. In all cases, any change to the IT service environment is channeled through change management as a request for change.

Configuration Management

Changes made to IT resources, also known as configuration items (CIs), and to service level objectives (SLOs) for these resources need to be reflected in the configuration management database (CMDB). Service level agreement availability and capacity data from the CMDB allows more proactive measurement of performance based on SLA compliance. This data is an important input to capacity management. Associated demand and workload requirements, resulting performance, and resource metrics are recorded in the capacity management database. Effective coordination and correlation of elements between these logical databases are required for timely information and ongoing capacity recommendation and planning.

Problem Management

Problem management deals with determining the root cause of problems. A problem is defined as one or more incidents exhibiting similar symptoms. Capacity management interacts with problem management to investigate known errors that have affected performance levels of an IT service. Capacity management also provides a specialist infrastructure role to identify and diagnose capacity- or performance-related problems. Capacity management provides ongoing feedback and recommended changes that result from incidents traced to known errors causing degraded performance levels of the service.

Service Desk

Incident frequency and statistics with respect to service performance levels may be reported through problem management, CMDB record, or involvement by the capacity management specialist to address known errors relating to performance and storage capacity. Ideally, IT resource performance is recorded and managed by the service desk and maintained by configuration management in the CMDB for historical retrieval and analysis. Workload, performance, and demand management activities may reference CMDB records resulting from incident escalation, failover and recovery capacity issues, or other tracked incident reports and trends.

Service Monitoring and Control

This process provides the foundation for determining service performance levels. Optimization of service performance implies monitoring the application's end-to-end response times. In a well-run IT environment, performance levels are forecast and the monitoring system sets threshold alarms to trigger alerts before the customer of the service becomes aware of an issue. Service monitoring and control is central to alerts affecting capacity and availability, and for judging the need for contingency or service continuity measures. Operating level requirements for service monitoring require management data views through custom or selected vendor software products.

The Capacity Plan

The capacity plan should document the current and predicted levels of resource utilization and service performance. It needs to consider business strategy and include in its forecast of future requirements the resources that support the delivery of IT services or the planning of new ones. Any recommendations the plan makes should include quantified details of necessary resources, any relevant impact, and associated costs and benefits.

Production of a capacity plan should occur at predefined intervals. Ideally, the plan should be published quarterly or in line with the business or budget life cycle. Updating the capacity plan should occur at predefined intervals or be triggered as the result of a significant change in business needs. A reissue of the updated plan will be necessary to account for changes in business plans, to report on the accuracy of forecasts, and to make or refine recommendations. This takes extra effort but, if it is regularly updated, the capacity plan is more likely to be accurate and to reflect the changes in business plans or requirements. A typical capacity plan will contain the following sections:

Introduction

Company background information should be introduced in this section. This can include the organization's current levels of capacity, current or anticipated problems due to overcapacity or undercapacity, the degree to which service levels are being achieved, and what has changed since the last update of the plan.

Scope of the Plan

Ideally, all IT services and resources need to be outlined in the plan. This section should specifically state which elements of the IT infrastructure are being addressed.

Methods Used

The capacity plan uses information gathered by subprocesses. This section should therefore contain details of how and when this information was obtained—for example, business forecasts obtained from business plans, workload forecasts obtained from users, or service level forecasts obtained by the use of modeling tools.

Management Summary

The capacity plan contains technical details that may not be of interest to all readers of the plan. The management summary needs to highlight the main issues, options, recommendations, and costs. It may be helpful to produce a separate executive summary document that contains the main points from each of the sections of the more detailed plan.

Business Scenarios

The plan should consider and describe the current and future business environment. For example, a new customer relationship management (CRM) solution may currently be utilizing 60 percent of current processor and memory capacity for its back-end database. Capacity management is involved in monitoring the current system and is able to forecast the recommended additional CPU, memory, and disk capacity to accommodate growth for the year.

It is important to explicitly mention all known business forecasts so that readers can determine what is inside and outside the scope of the plan.

Service Summary

A service profile should be provided for each service delivered. This should include resource utilization for a given transaction response time or throughput rate. For example, usage levels for processor, memory, storage, and network, as well as short-, medium-, and long-term trends, are presented in this section.

Forecasted Service Levels

The business plans should provide the capacity manager with details of the new services planned and the planned growth or contraction of existing services. This section should report on new services and the removal of legacy or redundant systems.

Resource Summary

This section concentrates on the resulting resource usage by the services. It reports again on the short-, medium-, and long-term trends in resource usage, broken down by hardware platform. This information needs to be gathered and analyzed by other service management activities such as resource management and service performance and should therefore be readily available.

Resource Forecasts

This section forecasts the likely resource usage resulting from the service forecasts. Each business scenario mentioned as part of the capacity plan should be addressed here. For example, a new Internet storefront project plan might include a forecast of network bandwidth requirements in anticipation of transaction levels and response time for the secured debit transaction. This forecast will use trending information gathered over a period of time to help determine and validate transaction levels based upon past experience and seasonal variation (peak usage times based upon the nature of the storefront).

Options for Service Improvement

Building on the results of the previous section, this section outlines the possible options for improving the effectiveness and efficiency of service delivery. It might contain options for merging different services on a single processor, upgrading the network to take advantage of technological advances, tuning the use of resource or service performance, rewriting legacy systems, or purchasing new hardware or software.

Cost Model

The costs associated with the service option improvements should be documented here, as well as the current and forecasted cost of providing IT services. In practice, the capacity manager obtains much of this information from the financial management process.

Recommendations

The final section of the plan should contain a summary of the recommendations made in previous plans and their status. Any changes made to the previous plans or new recommendations should be documented here. The recommendations should quantify business benefits to be expected, potential impact of carrying out the recommendations, risks involved, resources required, and both startup and ongoing costs.

Typical reports or capacity recommendations need to address the following areas:

The number of users supported by the current hardware.
Scalability options if the number of users increases.
Scalability options if the solution complexity increases.
Recommended changes in monitoring, analysis, or tuning.
Identification of potential bottlenecks.
Performance guidelines for design and development.
Prediction of future service performance.

The Capacity Management Database

The capacity management database (CDB), not to be confused with the configuration management database (CMDB), contains the detailed technical, business, and service level management data needed to support the capacity management process. It is used for recording current resource and service performance level data necessary for trend analysis, as well as for forecasting and planning reports. Portions of the data may overlap, link, or synchronize with other process repositories—for example, the CMDB. The configuration management process is responsible for keeping configuration items up to date in the CMDB. The capacity management process, on the other hand, records performance information about those configuration items in the CDB.

Table 1 represents an example layout for a typical CDB.

TABLE 1

| Field Name | Description |
| --- | --- |
| CapacityItemName | Name of item |
| CapacityItemType | Type—for example, service or resource |
| CapacityItemDescription | Free text description |
| UnitOfMeasurement | Measurement units—for example, kilobyte, milliseconds, or megahertz |
| UnitCost | Standardized financial cost of each unit |
| MaximumCapacity | Maximum possible capacity achievable by item |
| AlertThreshold | Current threshold at which an alert is first generated |
| ChildHierarchyItems | List of capacity items that this item depends on |
| ParentHierarchyItems | List of capacity items that depend on this item |
| TrendDataTimestamp | Timestamp when trend data is collected |
| TrendData | Data value captured |

The CDB is a central repository and is used to store and exchange capacity and performance data between the three subprocesses of the Capacity Management SMF. In addition, the CDB can be used by a number of the other SMF processes, such as service monitoring, problem management, and change management.

Inputs to consider for the CDB are:
Financial data—costs
Hardware data
Development data
Service data—problem/change
Contingency data—hardware and so on
Technical data—availability data and so on
Business data—future direction and strategy
Other detail input for the CDB includes:
Capacity plan—current in place; desktop publishing software
Model generators—parameters for sizing and modeling
Sizing software results
Modeling software results
Resource utilization monitors—threshold exceptions
Service level management—threshold exceptions
Other performance/surveillance software
Workload performance monitors Scenario-Based Example The following sections "act out" the three capacity management subprocesses for the fictitious scenario described in Table 2. Each section describes the typical inputs and outputs and summarizes the process actions and objectives. The purpose of this example is not to teach capacity management; instead it aims to illustrate, using a simple example, how the three capacity management subprocesses work together to analyze different types of information and how they all contribute to the overall capacity management needs for this given scenario.

Woodgrove is an international banking organization with centers in New York, London, and Tokyo. In order to expand its U.S. presence, it has acquired Contoso, a U.S.-only corporate banking and advisory business located in Chicago. The executive board at Woodgrove plans to use this acquisition to provide a broader portfolio of global financial services. Table 2 outlines the business, service, resource, and cost needs for Woodgorve.

TABLE 2

| | Present | Future |
| --- | --- | --- |
| Business Needs | Secure corporate e-mail to facilitate collaboration and external communications. | The need to extend corporate e-mail service to include all new staff located in Chicago. Enhanced SLA between advisory groups in Chicago, London, and Tokyo. |
| Service Needs | Existing Woodgrove Exchange infrastructure designed for 15,000 users at existing offices. Performance and availability as defined in existing SLA. | 3,000 new Contoso users currently using Lotus Notes. Existing messaging SLA to be maintained. New SLA needed to cover combined messaging infrastructure including new business requirements between advisory groups in Chicago, London, and Tokyo. 50 MB per user limit on data to be migrated to Exchange Message Store. All other data to be stored on departmental file servers or archived. |
| Resource Needs | See CMDB and the capacity management database for information on existing resources and trending information. | The following need to be determined: Server CPU requirements Server memory requirements Server storage requirements Server network requirements Microsoft Active Directory ® infrastructure requirements Network infrastructure requirements Server/network topology changes Printing requirements Backup requirements |
| Cost Needs | Corporate funding will be made available for support and administration charges needed to integrate IT systems. No funding for additional hardware; a re-use policy will be enforced for servers. Incremental cost budgeted for additional network infrastructure based on trend and forecast. | |

Business Capacity Management

The Woodgrove executive board and management teams have established a team to manage the acquisition of Contoso and coordinate all aspects of the transition phase. This acquisition team is made up of business unit managers, IT, operations, and finance. The acquisition team is responsible for managing the technical and business impact of the acquisition process to ensure a smooth transition and integration of the Contoso business and staff to Woodgrove.

Inputs
Acquisition plan with details of which locations will be kept and which will be consolidated with existing sites.

Updated business plan for the new combined business showing the opportunities for new business services and markets.

Acquisition budget and timescales for completion.

Process Summary

The acquisition plans are reviewed in detail with the stakeholders and a set of critical success factors for the-acquisition is compiled. These success factors include logistical, financial, legal, operational, and business elements of the acquisition. Risk management is a key part of the decisions at this stage, so a detailed risk assessment is undertaken and a risk register is created. (For more information, see the "MOF Risk Management Discipline for Operations" white paper at http://www.microsoft.com/technet/itsolutions/cits/mo/mof/mof-risk.mspx.)The business plan for the new combined business is also reviewed to ensure that the capacity plan is aligned with the strategic business needs as well as the short-term acquisition needs.

Output

Updated information in the capacity plan and CDB.

Service Capacity Management

The MOF Service Role Cluster is responsible for ensuring that the messaging services being provided to customers are aligned to the customers' stated needs. The Service Role Cluster maintains a working relationship with users and other stakeholders, understanding their need for mesaging services and managing the service impact of the acquisition.

Inputs

The SLA for messaging describes the minimum levels of service for the existing (pre-acquisition) messaging system. The updated CDB and capacity plan needs to be carefully reviewed since there may be new demands on the messaging service as a result of the acquisition. For example, messaging may become more time critical between two departments in Chicago and Tokyo as a result of a new global advisory service offered by the group to corporate clients.

Process Summary

This process defines and agrees upon a new SLA for the combined (post-acquisition) messaging system, taking into account the new business needs as stated in the acquisition plan and business plan. This SLA should express the new levels of service in terms of critical success factors—that is, measures of what the business expects the messaging system to offer and key performance indicators that define the metrics and value by which the performance will be measured.

Outputs

Agreed-upon SLA that now undergoes formal change management.

Updated information in the CDB and capacity plan.

Resource Capacity Management

Having a clear understanding about the service capacity requirement for the new messaging system, the architects at Woodgrove need to design a new global messaging architecture for the new combined group.

Inputs

The SLA for the combined messaging service defines the minimum levels of service required.

The capacity plan provides the broader business context for the capacity needs of the new organization, including the cost model and budget.

The CDB is a valuable source of capacity information, including trend information that can be used to predict future behavior.

Process Summary

Updated information about the existing deployment and workload of Exchange is collected from the CMDB and monitoring system. A simple model is created showing the topology of the existing Exchange servers in the various branches of Woodgrove. Each Exchange server is represented as a black box, and lines representing the network connections connect the black boxes. This model is now validated to ensure that it is an accurate, complete, and up-to-date representation of the existing Exchange infrastructure. Once complete, this model is baselined and undergoes change management.

The new Contoso locations are now added according to the proposed messaging architecture, including the network links.

Since one of the stated needs was to re-use the existing hardware at Contoso, these have to be profiled and their capacity and performance parameters assigned to the black boxes that represent the servers at Contoso.

For each possible Exchange architecture, a "what-if" simulation is run in order to generate Utilization, Transaction, and Bottleneck Analysis reports. Depending on the simulation method and technology used, reports can be generated to show how the model will perform for a given workload. The system used at Woodgrove generates the following reports:

The Utilization Analysis report provides a listing of all the devices in the system and their utilization for a typical peak morning workload.

The Transaction Analysis report provides a listing of all the Exchange transaction types, sorted by their average latency as seen by a user, with minimum and maximum latencies reported as well.

The Bottleneck Analysis report identifies components in the architecture that are likely to reach their maximum capacity first and become potential bottlenecks. It is important to know which component of the modeled architecture will have to be replaced first as the messaging load increases.

A number of "what-if" simulations are now run. Each time, the reports generated are analyzed to ensure the model architecture performs within the SLA at the required capacity levels. For each simulation, it may be necessary to optimize the model architecture until it meets the performance, capacity, and cost needs.

At the end of the modeling task, Woodgrove arrives at a messaging architecture that satisfies the business and service capacity needs.

Outputs

A detailed messaging architecture for the new combined Woodgrove and Contoso organization.

An updated capacity plan and CDB.

Recommended Technologies

All organizations that intend to implement capacity management would benefit by obtaining and making use of certain tools and technologies. The appropriate number and complexity of these tools depend on the size of the organization and the number and type of IT components it wants to manage.

This service management function guide takes a middle road by describing the tools needed to support the detailed processes that make up capacity management. The tools described here are sufficiently generic to enable all types and sizes of organizations to apply the advice.

Several Microsoft tools can help with the capacity management process. These include:
- Microsoft SQL Server™ or Microsoft Access for hosting a capacity management database, which all but the smallest of organizations will find essential.
- Microsoft Systems Management Server (SMS) for an automated inventory system for workstations and servers running Microsoft Windows.
- Microsoft Visio® Professional Edition for identifying network resources.
- Microsoft Excel for creating capacity models and implementing what-if scenarios. Microsoft Excel may be augmented by third-party add-ons to perform Monte Carlo simulations or other advanced modeling activities.

Capacity Planning Checklist

The following checklist describes a process that organizations may follow in completing or updating their capacity plan. This checklist was adapted from a more specific list developed and adopted by Microsoft's MSN organization.

Capacity Planning Process Checklist

The MOF Capacity Management Service Management Function provides detailed guidance for implementing capacity management within an IT organization. This annotated checklist provides a simple means to track your organization's progress in the development of a capacity plan, as described in the SMF.

Set Capacity Plan Milestones

As with any project, the manager should collect input from the team and stakeholders, then produce a schedule. This schedule, typically produced in an application such as Microsoft Project or Microsoft Excel, is published and updated periodically as the project progresses. Estimated dates should be set for major and interim milestones during the course of the project.

Collect Property Documents

This step entails the consolidation of existing documents, pointers to online resources, stress test results, marketing forecasts, server and network architecture diagrams, operations guides, and all other resources and data that may be used to support the development of the capacity plan. You should dedicate a central location for this collection of pointers; in some cases you may need to create or copy duplicate documents.

Hold Kick-off Meeting

The capacity planning manager holds this meeting to assemble the key stakeholders, gain consensus on what the project will accomplish, confirm target dates, assign responsibilities, and discuss key issues. Meeting notes should be taken and archived to assure accountability.

Specify and Justify OLA/SLA/PT (Performance Targets)

Without detailed agreements on the specific metrics to be delivered, it is not possible to build a realistic capacity plan. The operating level agreements (OLAs), service level agreements (SLAs), or in their absence, performance targets (PTs), must be specified in order to develop a meaningful plan for how they will be met. Further, the performance metrics must be justifiable. Those demanding a particular level of performance must be held accountable to justify the need for that level, since performance equates directly to capital expenditure. Typically, metrics are tied to service performance—the amount of time that a user must wait until a particular transaction is complete—service availability—whether the service is running and accessible by the customer when desired.

Specify and Justify Servers' Performance Requirements

At the OLA/SLA/PT level (described previously), commitments are negotiated concerning the overall performance requirements of an entire service (such as messaging or online transactions). At a more granular level, however, the performance characteristics of a property are an amalgamation of the components that make up the service. For example, the latency of a particular service might be the sum of latencies incurred in front-end servers, SQL servers, and network infrastructure components. In this step, capacity planners and infrastructure engineers examine each of the service components to specify and define the performance requirements at the component level.

Identify Workload Drivers

Workload drivers are the primary workload parameters (for example, transactions/sec, logons/sec, SQL queries/sec, or user profiles stored) that are used to determine component utilization and performance requirements. A given service may have multiple workload drivers operative, which will in turn drive the selection of CPUs, memory, storage capacity, ports, or other components.

Specify OLA/SLA/PT-Based Stress-Testing Requirements

This step specifies what correlations are to be made between various service components in order to meet targets for workload, performance, and utilization. Output is typically in spreadsheet or graphic format. The correlations, when completed, will show what the performance is for a given component at a specified workload (for instance, what is the latency and CPU utilization at a workload of some number n transactions per second. These correlations will help the capacity planner understand the constraints to performance of the service being analyzed.

Specify and Justify Redundancy Factors

In this step, the capacity planning team will consider the various redundancies that must be incorporated into the service in order to accommodate future operations activities (for example, rolling upgrades) or system failures. As new technology or improved infrastructure is rolled out, these redundancy values must be adjusted. This evaluation is accomplished with the assistance of the engineering team.

Analyze Actual Growth Trends—Compare with Forecast Estimates

This step provides a feedback loop between forecasted performance estimates and historical data. The analysis is used to help service customers refine and justify their service capacity requests and to examine the past service history.

Calculate thresholds for Workload Drivers

In this step, the capacity planning team determines the workload thresholds, based on:
Service performance requirements (OLA/SLA/PT).
Server performance requirements.
Workload, performance, and utilization metric correlation.
These data are derived from previous steps in the planning process. Workload thresholds are the values at which servers begin to fail in some aspect of their performance requirements (for example, latency or availability).

Conduct Capacity Modeling

Apply workloads, stress-testing data, forecast and historical data, and redundancy factors to determine infrastructure requirements to meet desired capacity.

Document Findings, Assumptions, Constraints, and Future Work
  Record the findings from your modeling effort.

Prepare Capacity Plan Draft, Finalize, and Obtain Stakeholder Sign-off
  Write, review, and sign off on the plan.

Update and Review Capacity Plan
  Plan becomes a "living document" subject to future review and revision The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed function. The one or more controller can be implemented in numerous ways, such as with dedicated hardware, or with general purpose hardware (e.g., one or more processor) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, it should be appreciated that one embodiment of the invention is directed to a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

What is claimed is:

1. A method of instructing at least one operator in a best practices implementation of a process for managing resource capacity in an information technology (IT) environment, the method comprising providing instructions to the at least one operator to perform acts of:
  (A) creating at least one model of at least some aspects of the IT environment by establishing a baseline model that reflects performance levels and workload characteristics of the current IT environment;
  (B) analyzing the at least one model to determine cost information relating to the modeled IT environment;
  (C) applying at least one simulated use condition to the at least one model;
  (D) analyzing performance of the at least one model under the at least one simulated use condition to determine information relating to at least a utilization of resources in the modeled IT environment and to determine resources in the modeled IT environment that create performance bottlenecks in the modeled IT environment; and
  (E) modifying at least one aspect of the at least one model impacting resource capacity based on the information determined in (B) and/or (D).

2. The method of claim 1, further comprising an act of instructing the at least one operator to repeat acts (B)-(E) to optimize the modeled IT environment.

3. The method of claim 1, further comprising an act of instructing the at least one operator to analyze the performance of the at least one model under the at least one simulated use condition to determine information relating to transactions performed in the modeled IT environment.

4. The method of claim 1, further comprising an act of instructing the at least one operator to perform resource capacity management in a hierarchical manner that comprises at least the following tiers:
  a business capacity management tier that ensures that future business requirements for the IT environment are considered, planned and implemented in time to be functioning when business needs make them desirable;
  a service capacity management tier that focuses on the management of the performance of operational services provided by the IT environment and used by users of the IT environment; and
  a resource capacity management tier that focuses on the management of individual components of the IT environment.

5. The method of claim 4, wherein the at least one model comprises at least one model of the IT environment at the business capacity management tier, at least one model of the IT environment at the service capacity management tier, and at least one model of the IT environment at the resource capacity management tier.

6. The method of claim 5, further comprising an act of instructing the at least one operator to consider the information derived from the at least one model of the IT environment at the service capacity management tier in determining modifications to the at least one model of the IT environment at the business capacity management tier.

7. The method of claim 5, further comprising an act of instructing the at least one operator to consider the information derived from the at least one model of the IT environment at the resource capacity management tier in determining modifications to the at least one model of the IT environment at the business capacity management tier.

8. The method of claim 5, further comprising an act of instructing the at least one operator to store information derived from the at least one model of the IT environment at the business capacity management tier, from the at least one model of the IT environment at the service capacity management tier, and from the at least one model of the IT environment at the resource capacity management tier in a common database.

9. The method of claim 1, further comprising an act of providing the instructions to the at least one operator as a portion of a broader set of instructions for best practices in implementing the IT environment, the broader set of instructions including instructions for best practices in implementing aspects of the IT environment other than resource capacity management.

10. The method of claim 1, further comprising an act of providing the instructions to the at least one operator as a portion of the Microsoft Operations Framework (MOF) that provides a set of instructions for best practices in implementing aspects of the IT environment, the MOF providing a set of instructions including instructions for best practices in implementing aspects of the IT environment other than resource capacity management.

11. A method of managing resource capacity in an information technology (IT) environment, the method comprising:
following best practices instructions for management of the resource capacity, including instructions to perform acts of:
(A) creating at least one model of at least some aspects of the IT environment by establishing a baseline model that reflects performance levels and workload characteristics of the current IT environment;
(B) analyzing the at least one model to determine cost information relating to the modeled IT environment;
(C) applying at least one simulated use condition to the at least one model;
(D) analyzing performance of the at least one model under the at least one simulated use condition to determine information relating to at least a utilization of resources in the modeled IT environment and to determine resources in the modeled IT environment that create performance bottlenecks in the modeled IT environment; and
(E) modifying at least one aspect of the at least one model impacting resource capacity based on the information determined in (B) and/or (D).

12. The method of claim 11, further comprising an act of following best practices instructions to repeat acts (B)-(E) to optimize the modeled IT environment.

13. The method of claim 11, further comprising an act of following best practices instructions to analyze the performance of the at least one model under the at least one simulated use condition to determine information relating to transactions performed in the modeled IT environment.

14. The method of claim 11, further comprising an act of following best practices instructions to perform resource capacity management in a hierarchical manner that comprises at least the following tiers:
a business capacity management tier that ensures that future business requirements for the IT environment are considered, planned and implemented in time to be functioning when business needs make them desirable;
a service capacity management tier that focuses on the management of the performance of operational services provided by the IT environment and used by users of the IT environment; and
a resource capacity management tier that focuses on the management of individual components of the IT environment.

15. The method of claim 14, wherein the at least one model comprises at least one model of the IT environment at the business capacity management tier, at least one model of the IT environment at the service capacity management tier, and at least one model of the IT environment at the resource capacity management tier.

16. The method of claim 15, further comprising an act of following best practices instructions to consider the information derived from the at least one model of the IT environment at the service capacity management tier in determining modifications to the at least one model of the IT environment at the business capacity management tier.

17. The method of claim 16, further comprising an act of following best practices instructions to consider the information derived from the at least one model of the IT environment at the resource capacity management tier in determining modifications to the at least one model of the IT environment at the business capacity management tier.

18. The method of claim 15, further comprising an act of following best practices instructions to store information derived from the at least one model of the IT environment at the business capacity management tier, from the at least one model of the IT environment at the service capacity management tier, and from the at least one model of the IT environment at the resource capacity management tier in a common database.

19. The method of claim 11, further comprising an act of following best practices instructions for resource capacity management provided as a portion of a broader set of best practices instructions for implementing the IT environment, the broader set of instructions including instructions for best practices in implementing aspects of the IT environment other than resource capacity management.

20. The method of claim 11, further comprising an act of following best practices instructions for resource capacity management provided as a portion of the Microsoft Operations Framework (MOF) that provides a set of instructions for best practices in implementing aspects of the IT environment, the MOF providing a set of instructions including instructions for best practices in implementing aspects of the IT environment other than resource capacity management.

* * * * *